United States Patent [19]
Hadfield

[11] Patent Number: 5,179,445
[45] Date of Patent: Jan. 12, 1993

[54] IMAGE INTENSIFIERS HAVING MEANS TO REDUCE ELECTROMAGNETIC INTERFERENCE

[75] Inventor: Kevin A. D. Hadfield, Chelmsford, United Kingdom

[73] Assignee: EEV Limited, Essex, United Kingdom

[21] Appl. No.: 661,312

[22] Filed: Feb. 27, 1991

[30] Foreign Application Priority Data

Mar. 10, 1990 [GB] United Kingdom ............... 9005444

[51] Int. Cl.$^5$ .................. H04N 5/235; H04N 3/30
[52] U.S. Cl. .................... 358/219; 358/217; 358/211
[58] Field of Search .......... 358/219, 211, 213.19, 358/217

[56] References Cited

U.S. PATENT DOCUMENTS

| | | | |
|---|---|---|---|
| 3,553,363 | 12/1968 | Anderson | 358/219 |
| 3,864,595 | 2/1975 | Lawrence et al. | |
| 4,025,955 | 5/1977 | Grallien et al. | 358/219 |
| 4,771,333 | 9/1988 | Michaels | |
| 4,839,569 | 6/1989 | Dallin, II | 358/219 |
| 4,872,057 | 10/1989 | Woolfolk | 358/211 |
| 4,882,481 | 11/1989 | Gilligan et al. | |
| 4,935,817 | 6/1990 | Gilligan | 358/211 |
| 5,040,070 | 8/1991 | Higashitsutsumi et al. | 358/213.19 |

FOREIGN PATENT DOCUMENTS

2350684 12/1977 France.
1285210 8/1972 United Kingdom.

*Primary Examiner*—Michael Razavi
*Assistant Examiner*—Wendy R. Greening
*Attorney, Agent, or Firm*—Spencer, Frank & Schneider

[57] ABSTRACT

The high voltage power supply of an image intensifier is operated intermittently to minimize the effect on a resulting intensified image of interference produced by the power supply, the input capacitance of the intensifier maintaining the high voltage at an acceptable level when the power supply is not operating. When used in conjunction with a video camera, the power supply may be allowed to operate only during the frame synch and/or line synch periods. A shutter may inhibit operation of the image intensifier while its power supply is operating.

15 Claims, 4 Drawing Sheets

IMAGE INTENSIFIERS HAVING MEANS TO REDUCE ELECTROMAGNETIC INTERFERENCE

BACKGROUND OF THE INVENTION

1. Field of the Invention

This invention relates to image intensifiers, in particular, image intensifiers utilising a high operating voltage but energised from a low voltage power source by means of dc to dc converters.

2. Description of Related Art

Image intensifiers usually require high voltages, typically 10 kV or more to make them operate. To allow them to be used with batteries or other low-voltage power sources, it is common to use a power supply comprising a dc to dc converter which accepts a low input voltage, for example 2.5 to 3 volts, and delivers the higher voltage, typically 10 kV or more, required by the image intensifier. Because of size restraints it has been proposed to construct the converter in the form known as a 'wrap around' power supply, that is to say, the converter circuitry surrounds and is potted in the same cylindrical case as the intensifier. Such an arrangement is illustrated in FIG. 1, and comprises a cylindrical case a 'wrap around' converter power supply 2, and an intensifier 3. As well as being compact, this arrangement allows the lead lengths of high voltage-carrying conductors to be kept to a minimum, which enhances safety.

FIG. 2 shows in diagrammatic form the operation of a simple image intensifier. The intensifier 3 is energised by a power supply 10, which generally comprises a dc to dc converter including an intermediate ac stage. Light 4 from an image-producing source, (not shown), produces an image on the photo-cathode 8. Electrons emitted from the photo-cathode are accelerated along paths 9 in an electric field and are focused by means of focus electrodes 7 so as to produce an image on a phosphor 6. The image so produced is an amplified version of the image on the photo-cathode 8, and can be viewed by the eye of an observer or further optical apparatus such as a video camera, (not shown), at 5.

However, a number of problems have been encountered with this arrangement. The first is that the varying magnetic field from the inductive components of the converter will tend to modulate the paths of the electrons inside the intensifier. Hence electrons from any particular point on the photo-cathode will not always impinge on the corresponding point of the anode phosphor, resulting in an image with reduced sharpness.

The second problem arises when the intensifier is used in conjunction with some form of electronic imaging system, when interference from the intensifier power supply can cause objectionable interference in the TV picture.

Prior art solutions to these problems have involved magnetic and electrical screening, but these techniques can be expensive to implement, making assembly more difficult and adding significantly to the cost and size of the system.

The present invention has arisen in an attempt to eliminate or reduce the effects of the disadvantages of the prior art.

SUMMARY OF THE INVENTION

In accordance with the invention, an image intensifier apparatus utilising a high operating voltage, includes a power supply for producing the voltage operable in an intermittent manner such that the power supply is enabled for a period which is much less than the period for which it is inhibited.

The apparatus may include an optical shutter or an electrical arrangement to inhibit operation of the image intensifier while the power supply is enabled. The apparatus may also include a video camera such as a CCD video camera, the power supply only being allowed to operate during the picture blanking and/or line blanking periods of the camera. The power supply may be a dc to dc converter.

Since the current drain by the image intensifier is relatively small, the capacitance is sufficient to maintain the output voltage at an acceptable value during the period in which the power supply is turned off.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
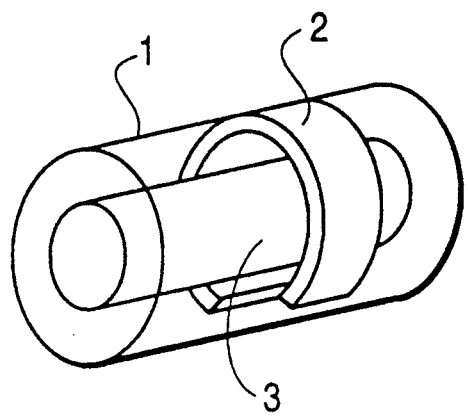
FIG. 1 shows in schematic form an image intensifier module.
Figure 2:
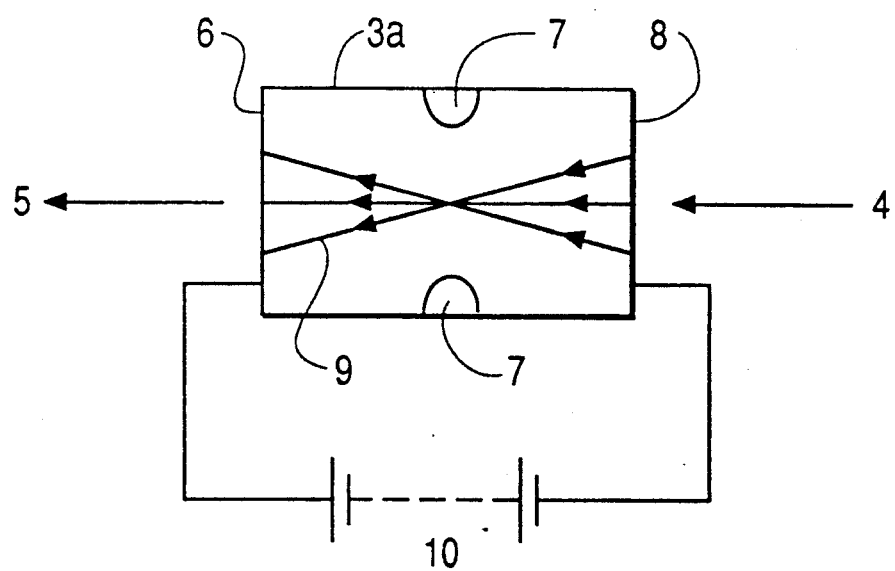
FIG. 2 snows in diagrammatic form the idealised operation of a simple image intensifier.
Figure 3:
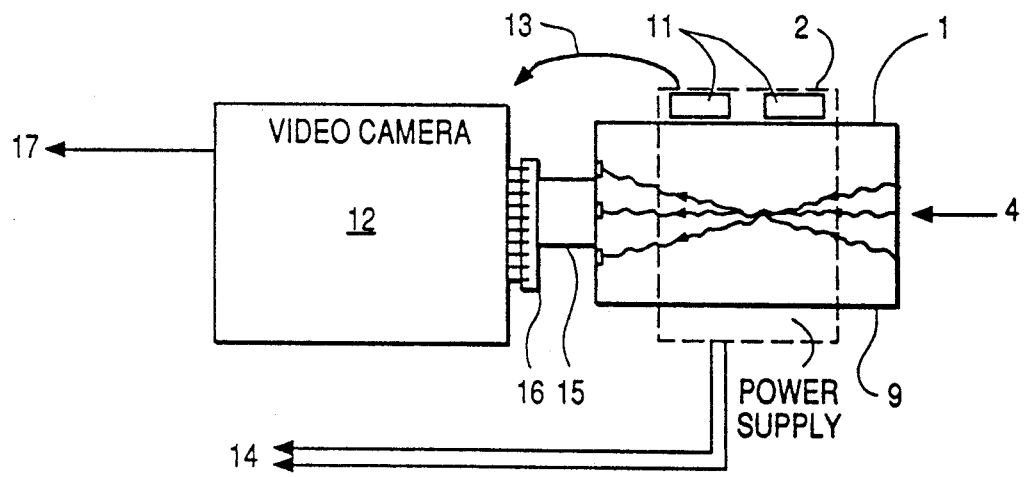
FIG. 3 shows an image intensifier apparatus incorporating a CCD video camera.

A first embodiment of the invention will now be described with reference to FIGS. 3, 4 and 5. In FIG. 3, a video camera 12 has an imager 16, for example a CCD imager which is coupled to the amplified image produced by the image intensifier 1 via an optical coupling 15. The power supply 2 of the image intensifier I comprises a dc to dc converter having an inverter to convert the low voltage dc input to high frequency ac which is transformed and rectified, possibly by means of a voltage multiplier, to produce the high voltage dc output. The power supply 2 includes one or more transformers 11 When the power supply 2 is operating, magnetic coupling from the transformers 11 can give rise to spurious modulation of the electron paths 9 within the intensifier, while coupling 13 by radiation between the transformers 11 and sensitive video processing circuitry within the video camera 12 can give rise to interference in the video signals. If the camera 12 and image intensifier 1 share a common power supply, a further coupling path for interference between the converter and the camera exists via the power supply leads 14. This video signal interference typically results in a TV picture having diagonal lines or bands, which can be quite objectionable.

Figure 4:
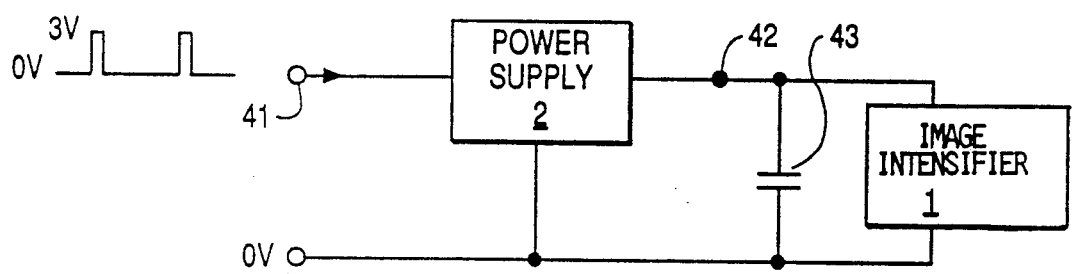
FIG. 4 shows a block diagram of an image intensifier apparatus in accordance with the invention.
Figure 5:
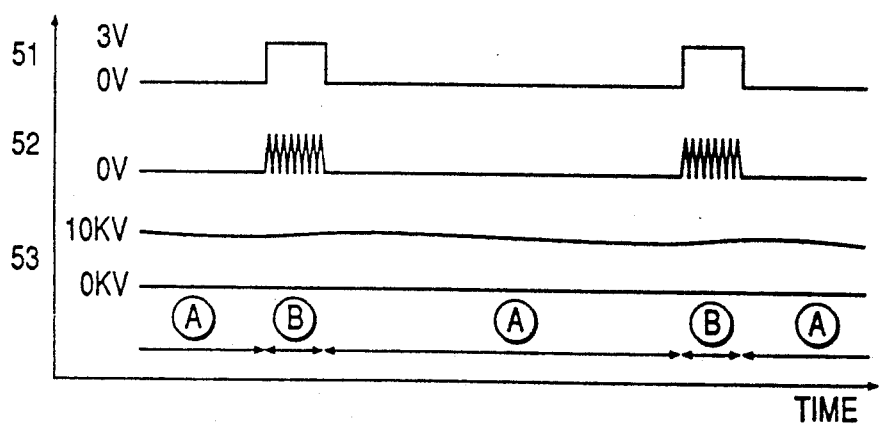
FIG. 5 shows a waveform diagram illustrating the operation of the apparatus in accordance with the invention.

In accordance with the invention, the input power supply is not applied continuously, but, as shown in FIGS. 4 and 5, is repetitively pulsed on and off. In FIG. 5, 51 shows the pulsed input voltage applied to terminal 41 of FIG. 4, 52 represents the oscillations which are produced within the dc to dc converter as a consequence of the dc to dc voltage conversion, 53 shows the variation of the output voltage on terminal 42. In operation, it is arranged that the converter ON period B, is much shorter than its OFF period A. Although the converter is only producing a high voltage output for a small proportion of the total time, the capacitance 43 at the output terminal 42 of the converter due to the converter output capacitance and the intensifier input capacitance, is generally sufficient to maintain the high voltage at an acceptable level during the periods when the converter is not operating. For example, the on time A may be 1 mS and the OFF time B 19 mS: these times are given by way of example only for the purpose of explaining the operation of the invention and are not intended to limit the scope of the invention.

It is preferred that the first period of time A is to more than 10 ms, and the ratio of the first period of time A and second period of time B is not less than 1:10, respectively.

In this example if the eye is viewing the phosphor directly, then it will be looking at the less sharp image for the 5% of the time that the converter is operating, but for 95% of the time it will be looking at the sharper image obtained when the converter is not operating. The combination of phosphor persistence and visual persistence will result in the perception of a picture which is the weighted average of the sharper and less sharp images. Because the weighting is strongly biased towards the sharper image the eye will see a picture which is very nearly as good as if the intensifier was not influenced by the magnetic field from the converter.

While this embodiment has been described as operating by pulsing the low voltage power supply, 2 the invention is not limited to this arrangement. For example, the low voltage power supply 2 could be left continuously connected, the converter being provided with an internal or external gating arrangement to turn it on and off in the manner described.

Figure 7:
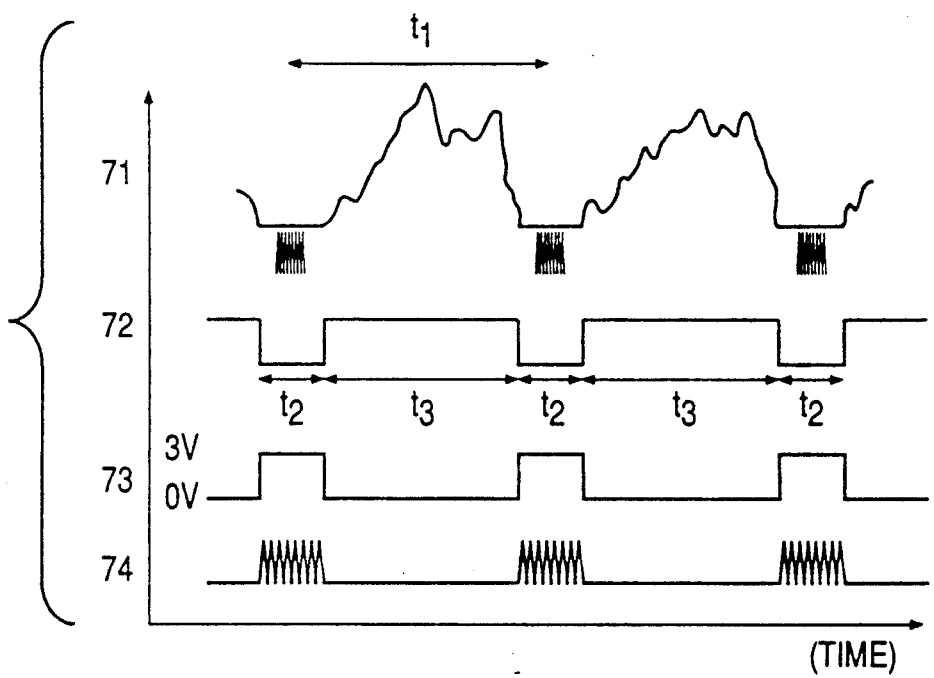
FIGS. 7 and 8 show waveform diagrams illustrating the operation of the apparatus in accordance with the invention.

A second embodiment of the invention, will now be described with reference to FIGS. 3 and 7.

As has been previously described, in the arrangement of FIG. 3, the video camera suffers from interference from the dc-dc converter in power supply 2 when the converter operates continuously. In the second embodiment of the invention, the converter in power supply 2 of the image intensifier 1 is allowed to operate only during the picture blanking period. FIG. 7 shows a waveform diagram illustrating the operation of the arrangement of FIG. 3 in accordance with the invention. In FIG. 7, 71 represents a composite video signal in which t1 denotes the duration of one complete picture. In a CCIR 50 Hz video standard, the picture rate is 20 mS. Note that, for clarity, the line synch pulses are not shown in 71. 72 represents the picture blanking pulses. Each blanking pulse has a duration t2, during which time the picture is blanked. In the CCIR 50 Hz system, t2 =1.6 mS. 73 represents the input voltage to the converter 2. 74 represents the oscillating voltage developed in the converter in power supply 2 during conversion. It is evident from FIG. 7 that, as oscillations only occur during the picture blanking period t2, they will not cause interference in the video information produced during time t3.

It is to be noted that, while the oscillator is shown as operating during the whole of the picture blanking period t2, it is not necessary that it actually operates during the whole of this time. It is only necessary that the converter in power supply 2 be enabled to operate only during time t2 and inhibited from operating during time t3. For example, if the converter incorporates means for sensing its output voltage and only operates when its output voltage falls below a threshold value, then, it is possible that it will not need to operate during every period t2, or for the entire duration of t2.

In a modification of this arrangement, the converter in power supply 2 may be enabled for slightly longer than the picture blanking period t2. In this case the first few lines preceding and/or following the picture blanking period will be susceptible to interference from the converter oscillator. However, this may not be objectionable, especially if the camera is used in conjunction with an overscanned monitor when the affected lines will not be visible to the viewer.

In a further modification, the converter in power supply 2 may be enabled during the line blanking period in addition to or instead of during the picture blanking period.

Figure 8:
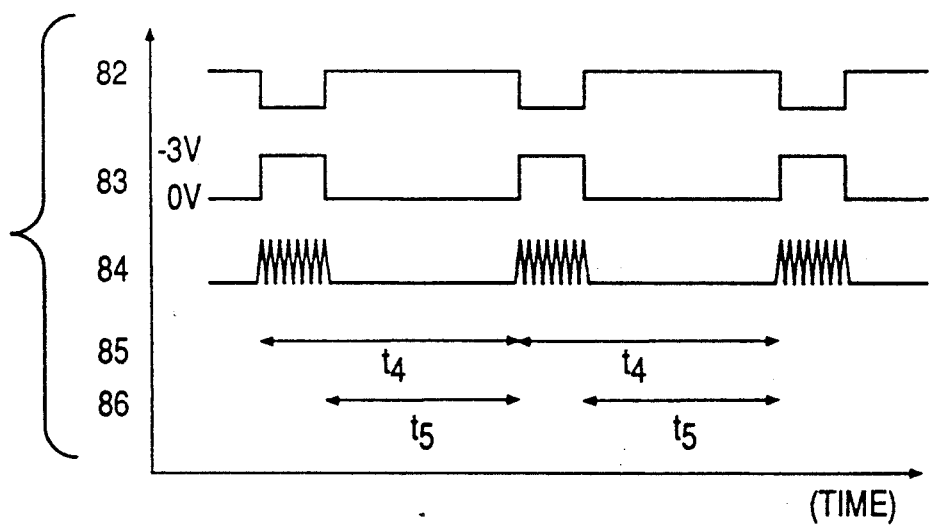

A third embodiment of the invention will now be described with reference to FIGS. 3 and 8. In FIG. 8, 82, 83, and 84 represent the same waveforms as 72, 73 and 74 in FIG. 7. 85 represents the standard exposure time t4 of the imager 16 of the video camera 12 in FIG. 3, which in a CCIR 50 Hz system is 20 mS. As charge is integrated during the whole of time t4, which time includes the frame blanking period, both the sharp image produced whilst the power supply is disabled and the unsharp image produced while it is enabled are integrated, thereby producing a degraded image. To eliminate this degradation, the imager is only allowed to integrate an image during the time t5 when the converter oscillator is not enabled. This also substantially eliminates the possibility of interference from the convertor 2 affecting the image produced on the imager 16, as image information produced while the convertor is enabled is not used. For example, in the 50 Hz system referred to above, t5 may be 18 mS.

Image integration may be inhibited in a number of ways. Where the imager is a CCD imager, it may be operated so as to dump that photogenerated charge which is developed during the time that the converter is enabled. This may be done by any convenient method, such as by a reverse clocking technique as described in GB patent 2140651B.

Figure 6:
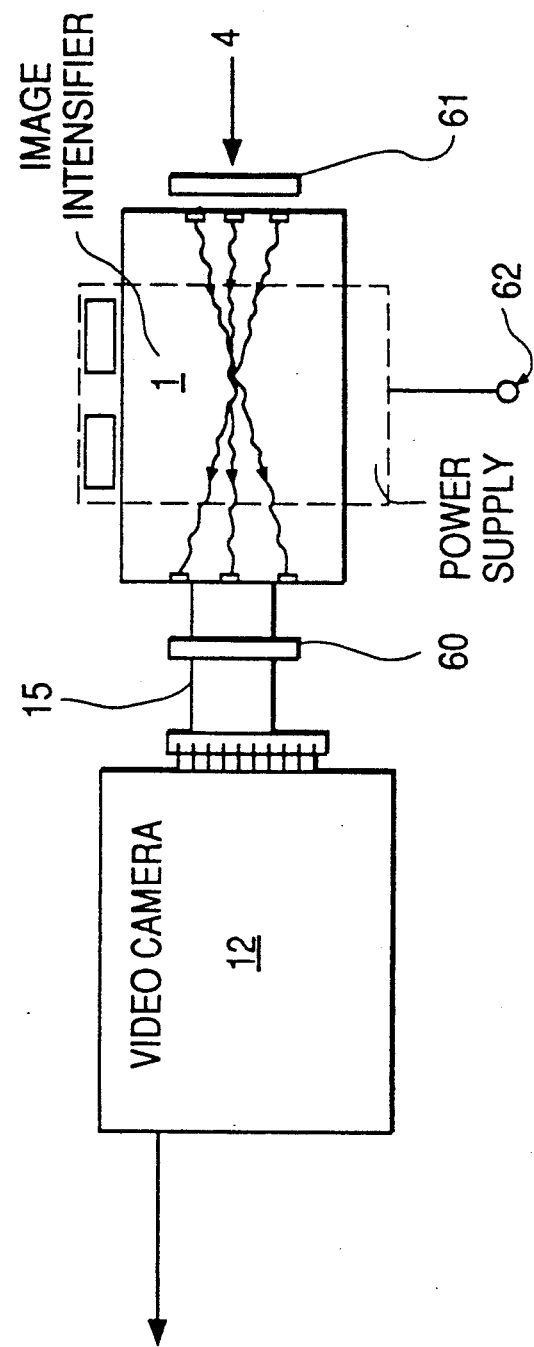
FIG. 6 shows an image intensifier apparatus in accordance with the invention.

An alternative manner in which this may be achieved and which involves no modification to the video camera, is to prevent light from reaching the imager during the relevant period. This may be done in a number of methods as will be described with reference to FIG. 6.

One way is to interpose an optical shutter in the light path between the image source and the imager. Alternative positions for such a shutter are indicated at 60 and 61. The shutter may be interposed in the optical coupling path 15 at position 60 between the image intensifier output and the imager, or at 61 at the input of the image intensifier 1. The shutter may be of any convenient type, such as mechanical or electro-optical shutters. It would be possible to have shutters at both positions 60 and 61.

Another way is to inhibit the operation of the image intensifier 1 during at least the period that the converter 2 is enabled, the precise period being inter alia a function of the persistence time of the phosphor of the image intensifier output. This may be done by a number of different techniques according to the type of intensifier being used. Inhibition may be effected by applying a suitably timed gating signal to a control terminal 62. Alternatively, as the imager needs to be enabled when the converter is inhibited, and vice versa, the necessary gating signals may be generated by circuitry within the converter. For example, a simple intensifier of the type known in the art as GEN I, can be inhibited by removing the high voltage from one of the electrodes. In more complex image intensifiers, such as micro channel plate intensifiers, operation may be inhibited by reverse biassing certain electrodes within the intensifier, thereby inhibiting the passage of electrons through the intensifier.

While reducing the time during which the image is integrated has the effect of reducing sensitivity due to the reduced exposure time, in many applications the improvements in image quality more than compensate for the slight loss in sensitivity.

While the embodiments of the invention have been described with reference to image intensifiers whose power supplies comprise dc to dc converters, this is for the purpose of illustration only, and the invention is equally applicable to image intensifiers having any type of power supply which produces interference whilst operating.

I claim:

1. Image intensifier apparatus utilizing a high operating voltage, said apparatus comprising:
    image intensifier means for receiving an input image and producing an intensified output image;
    power supply means coupled to said image intensifier means for producing said high operating voltage;
    means coupled to said power supply means for operating said power supply means in an intermittent manner such that said power supply means is alternately enabled and inhibited, said power supply means being enabled to produce said high operating voltage for a first period of time and being inhibited from producing the high operating voltage for a second period of time, said first period of time being less than aid second period of time; and
    means for inhibiting operation of said image intensifier means during said first period of time.

2. Image intensifier apparatus according to claim 1, in which the means for inhibiting operation comprises electrical gating means for disabling aid image intensifier means during said first period of time.

3. Image intensifier apparatus according to claim 1, in which said means for inhibiting operation comprises an optical shutter means for preventing said image intensifier means from producing an image during said first period of time.

4. Image intensifier apparatus according to claim 1 in which said first period of time and said second period of time are in a ratio of not less than 1:10.

5. Image intensifier apparatus according to claim 1 in which said first period of time is not more than 10 mS.

6. Image intensifier apparatus according to claim 1, further comprising video camera means for capturing the intensified output image.

7. Image intensifier apparatus according to claim 6 in which said video camera means captures the intensified output image during aid second period of time.

8. Image intensifier apparatus according to claim 7, in which said video camera means has a picture capture period and a picture blanking period, said picture blanking period occurring during at least part of said first period of time.

9. Image intensifier apparatus according to claim 8, in which the first period of time occurs entirely during the picture blanking period.

10. Image intensifier apparatus according to claim 6, in which said video camera means comprises a CCD imager.

11. Image intensifier apparatus according to claim 1, in which said power supply means is an integral part of said image intensifier means.

12. Image intensifier apparatus according to claim 1, in which said power supply means comprises a dc to dc converter.

13. Image intensifier apparatus utilizing a high operating voltage, said apparatus comprising:
    image intensifier means for receiving an input image and producing an intensified output image;
    power supply means coupled to said image intensifier means for producing said high operating voltage;
    means coupled to said power supply means for operating said power supply means in an intermittent manner such that said power supply means is alternately enabled and inhibited, said power supply means being enabled to produce said high operating voltage for a first period of time and being inhibited from producing the high operating voltage for a second period of time, said first period of time being less than said second period of time; and
    video camera means for capturing the intensified output image, said video camera means comprising a line blanking period, and said first period of time occurs within said line blanking period.

14. Image intensifier apparatus according to claim 10, further comprising charge dumping means for dumping charge collected on the CCD imager during said first period of time.

15. Image intensifier apparatus according to claim 14 in which charge collected on said CCD imager during a period of time contiguous with said first period of time is dumped.

* * * * *